No. 657,850. Patented Sept. 11, 1900.
G. BARTLETT.
SAW SHARPENING MACHINE.
(Application filed Apr. 23, 1900.)
(No Model.)

WITNESSES:
Jos. A. Ryan
Edw. W. Byrn

INVENTOR
Granville Bartlett.
BY Munn & Co.
ATTORNEYS

THE NORRIS PETERS CO., PHOTO-LITHO., WASHINGTON, D. C.

UNITED STATES PATENT OFFICE.

GRANVILLE BARTLETT, OF LEXINGTON, KENTUCKY.

SAW-SHARPENING MACHINE.

SPECIFICATION forming part of Letters Patent No. 657,850, dated September 11, 1900.

Application filed April 23, 1900. Serial No. 13,935. (No model.)

*To all whom it may concern:*

Be it known that I, GRANVILLE BARTLETT, of Lexington, in the county of Fayette and State of Kentucky, have invented a new and useful Improvement in Saw-Sharpening Machines, of which the following is a specification.

My invention is in the nature of an improved saw-filing machine of that form in which the saw is held in a clamp and the filing-bar, with file, is reciprocated in guides across the edge of the saw.

My invention consists in the improved construction and arrangement of parts looking to the more perfect adjustment and regulation of the work and the better inspection of the same while in progress, as will be hereinafter fully described with reference to the drawings, in which—

Figure 1:
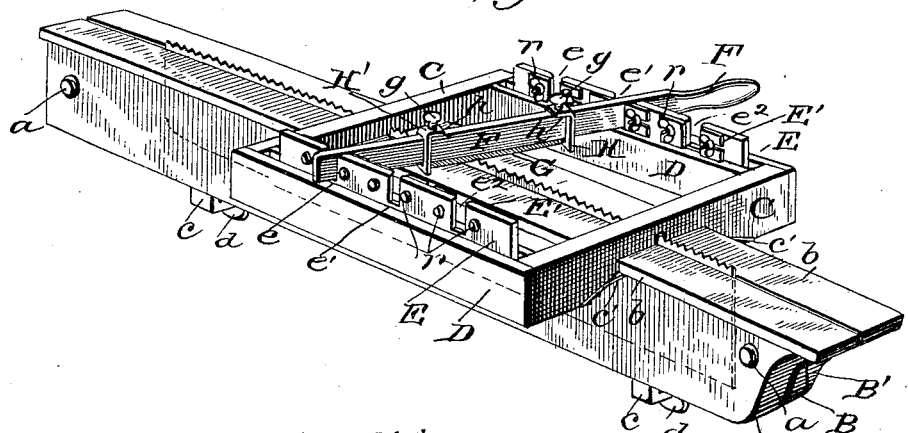
Figure 2:
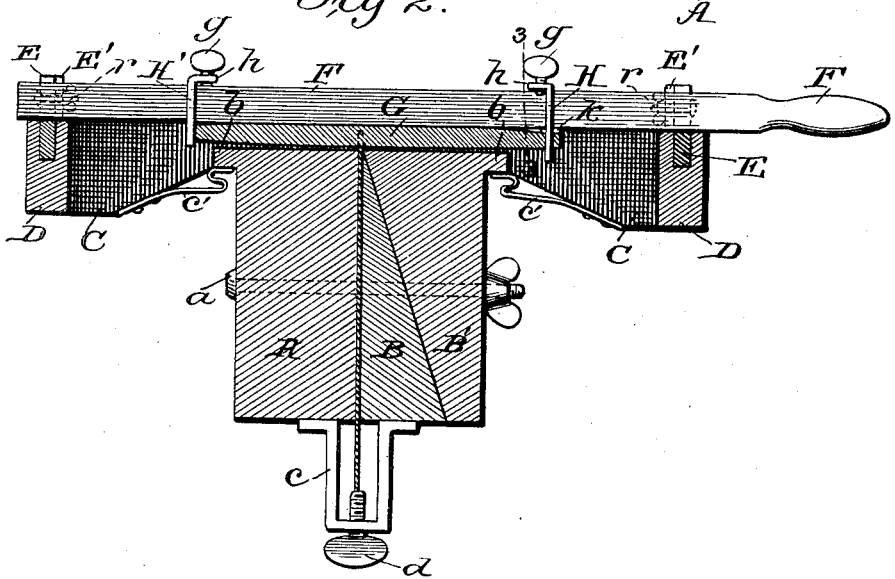

Figure 1 is a perspective view; Fig. 2, an enlarged cross-section, and Fig. 3 a cross-section of the file-bar.

In the drawings, A B B' represent the saw-clamp, which is made in three parts for the purpose hereinafter described. This clamp is made curved in its length on the upper side from end to end, corresponding to the slight curve of the cutting edge of a saw, which should always be somewhat convex. The clamp is made long enough to receive the full length of the saw and allow all its teeth to be sharpened without changing its position. The object in making the clamp in three pieces is to enable the saw to be clamped in a vertical plane between the sections A and B and the teeth to be filed at right angles to the saw-blade or to permit the latter to be placed between the sections B and B' and have the teeth filed at an oblique angle. The three sections of the clamp are held together at the ends by bolts $a$ at points beyond the ends of the saw-blade. The outer sides of the clamp are also rabbeted, so as to leave overhanging lips or flanges $b\ b$ along their upper edges, while underneath the clamps there are attached two stirrups $c\ c$, with set-screws $d\ d$ tapped through the bottom of the same and forming bearings for the bottom edges of the saw, by which the saw-blade may be adjusted to bring its teeth to the proper distance above the level of the clamp to be filed.

The saw-clamp A B B' is designed to be held in a vise or in any other suitable holder, and on the curved top of the clamp there slides a carriage C, which is advanced along the clamp as the teeth are filed. This carriage is a rectangular frame whose end bars are recessed to receive the upper edge of the clamp, so that the carriage is held against lateral movement on the clamp during the filing action, whose strain is at right angles to the clamp. This carriage is held down upon the clamp against slipping off by two springs $c'\ c'$, fixed to one end section of the carriage and extending under the flanges $b\ b$ of the clamp with a frictional bearing. The top of the clamp A B B' is made rather broad, or wide enough to hold the file-bar carriage steady when filing.

In the side bars D of the carriage there are longitudinal grooves or recesses in which are seated file-bar guides E, one set on each side, and which are made in sections, so they may be spread apart or closed together to permit filing across the saw at any desired angle. These guides form three notches $e\ e'\ e^2$ in their upper edges to receive the ends of the file-bar and guide it as it is reciprocated. The notches are provided on the inner sides of the guides with slides E', which are slotted and adjustably secured to the guides by a thumb-nut and bolt $r$ and which slides are designed to be set up close to the faces of the moving file-bar as it reciprocates to take up wear on the guides and hold the file-bar true. These slides add much to the durability of the file-bar guides.

F is the file-bar, which is flat, with its greatest cross-sectional measurement in a vertical plane.

Figure 3:
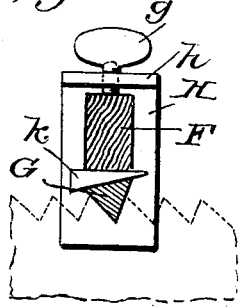

G is the file, which is secured to the under side of the file-bar by slotted stirrups H H'. The rear stirrup has a V-shaped notch for the file to lie in, so that the file is held in proper position to cut the teeth of the saw the proper pitch. A beveled key $k$, Fig. 3, is placed between the file and file-bar. The stirrup is drawn up to the file, which tightens against the key, and it is tightened against the file-bar by a set-screw $g$, tapped through a right-angular flange $h$ on the upper edge of the stirrup and bearing against the file-bar. The front file-stirrup has a tapering hole to receive the front of the file, and any change in the position of the file in its stirrups may be effected by means of keys beveled on one side.

In filing a saw the latter is clamped, as before described, with the teeth sufficiently above the clamp to receive the edge of the file when the file-bar is resting in the notches of the file-guides. The file-carriage is made of sufficient width to allow a full stroke of the file from either side of the saw to the inside of the carriage. By making the carriage in this manner there is not only a full movement secured for the file, but there is no obstruction to a full view of the saw-teeth while filing the same, so as to ascertain when the tooth is sufficiently sharp.

In constructing the clamp A B B' the sides should be thin enough to permit them to be slightly sprung under the compressing strain of the vise, so as to more firmly clamp the saw.

For sharpening saws which have a straight edge the clamps will be made straight instead of curved on their upper edges.

Having thus described my invention, what I claim as new, and desire to secure by Letters Patent, is—

1. A saw-sharpening machine, consisting of a clamp composed of three separate parts having two spaces for receiving and clamping the saw in different planes, bolts passing through the three parts of the clamp, and a movable file-carriage with guides, and a file-bar reciprocating therein substantially as described.

2. In a saw-sharpening machine, the combination with the saw-clamp; of a file-carriage made in rectangular form with two of its sides parallel with but offset from the saw-clamp and provided with a set of guides, and a file-holder reciprocating therein substantially as described.

3. In a saw-sharpening machine, the combination with the saw-clamp; of a file-carriage made in rectangular form with two of its sides parallel with but offset from the saw-clamp, a series of adjustable guides arranged in said parallel sides, a file-holder reciprocating therein, and means for holding the carriage upon the clamp substantially as described.

4. In a saw-sharpening machine, the combination of the saw-clamp made in sections and having flanges $b\ b$ and provided with clamping-bolts and subjacent adjusting-screw, a saw-carriage made in rectangular form with end pieces cut away on the under side and provided with springs $c'\ c'$ underlapping the flanges $b\ b$, and having also side pieces parallel with and offset from the clamp and provided with guides, and a file-holder reciprocating therein and carrying a file substantially as and for the purpose described.

In testimony whereof I have signed my name to this specification in the presence of two subscribing witnesses.

GRANVILLE BARTLETT.

Witnesses:
I. B. BARTLETT,
O. L. BARTLETT.